United States Patent
Tanaka et al.

(10) Patent No.: US 12,326,692 B2
(45) Date of Patent: Jun. 10, 2025

(54) ELECTROSTATIC CHARGE IMAGE DEVELOPING TONER, ELECTROSTATIC CHARGE IMAGE DEVELOPER, AND TONER CARTRIDGE

(71) Applicant: FUJIFILM Business Innovation Corp., Tokyo (JP)

(72) Inventors: Tomoaki Tanaka, Kanagawa (JP); Yukiaki Nakamura, Kanagawa (JP); Ryutaro Kembo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 731 days.

(21) Appl. No.: 17/586,731

(22) Filed: Jan. 27, 2022

(65) Prior Publication Data

US 2023/0105118 A1    Apr. 6, 2023

(30) Foreign Application Priority Data

Sep. 22, 2021 (JP) .................................. 2021-154744

(51) Int. Cl.
| | |
|---|---|
| *G03G 9/097* | (2006.01) |
| *C09B 47/30* | (2006.01) |
| *G03G 9/08* | (2006.01) |
| *G03G 9/087* | (2006.01) |
| *G03G 9/09* | (2006.01) |
| *G03G 15/08* | (2006.01) |

(52) U.S. Cl.
CPC ........... *G03G 9/0926* (2013.01); *C09B 47/30* (2013.01); *G03G 9/0821* (2013.01); *G03G 9/08711* (2013.01); *G03G 9/0902* (2013.01); *G03G 9/0918* (2013.01); *G03G 15/0865* (2013.01)

(58) Field of Classification Search
CPC .......................... G03G 9/0918; G03G 9/09708
See application file for complete search history.

(56) References Cited

U.S. PATENT DOCUMENTS

| | | | |
|---|---|---|---|
| 8,178,267 B2 | 5/2012 | Hirose et al. | |
| 9,182,689 B2 | 11/2015 | Kamiwaki et al. | |

FOREIGN PATENT DOCUMENTS

| | | | | |
|---|---|---|---|---|
| JP | H0611900 | 1/1994 | | |
| JP | 2000258950 | 9/2000 | | |
| JP | 2000267338 | 9/2000 | | |
| JP | 2006154641 | 6/2006 | | |
| JP | 2006276814 | 10/2006 | | |
| JP | 2009237156 | 10/2009 | | |
| JP | 2010-002897 | * 1/2010 | ............... | G03G 9/09 |
| JP | 2010097101 | 4/2010 | | |
| WO | WO 2018-190247 | * 10/2018 | ........... | G03G 9/0922 |

OTHER PUBLICATIONS

Translation of JP 2010-002897.*
Translation of WO 2018-190247 A1.*
"Office Action of Japan Counterpart", issued on Apr. 22, 2025, with English translation thereof, p. 1-p. 5.

* cited by examiner

*Primary Examiner* — Peter L Vajda
(74) *Attorney, Agent, or Firm* — JCIPRNET

(57) ABSTRACT

An electrostatic charge image developing toner includes a toner particle that contains a silicon phthalocyanine dye and a zirconium oxide particle.

13 Claims, 2 Drawing Sheets

ELECTROSTATIC CHARGE IMAGE DEVELOPING TONER, ELECTROSTATIC CHARGE IMAGE DEVELOPER, AND TONER CARTRIDGE

CROSS-REFERENCE TO RELATED APPLICATIONS

This application is based on and claims priority under 35 USC 119 from Japanese Patent Application No. 2021-154744 filed Sep. 22, 2021.

BACKGROUND

(i) Technical Field

The present invention relates to an electrostatic charge image developing toner, an electrostatic charge image developer, and a toner cartridge.

(ii) Related Art

Methods of visualizing image information, such as electrophotographic methods, are currently used in various fields. In the electrophotographic methods, an electrostatic charge image is formed as image information on a surface of an image holding member by charging the surface thereof and forming an electrostatic charge image. Further, a toner image is formed on the surface of the image holding member using a developer containing a toner, the toner image is transferred to a recording medium, and the toner image is fixed to the recording medium. The image information is visualized as an image by performing such steps.

For example, JP2010-002897A discloses a full-color toner kit for forming a full-color image from at least a yellow toner, a magenta toner, a cyan toner, and a black toner, in which the yellow toner contains a yellow pigment selected from at least C.I. Pigment Yellow 74, C.I. Pigment Yellow 139, C.I. Pigment Yellow 155, C.I. Pigment Yellow 180, and C.I. Pigment Yellow 185, the magenta toner contains at least a dye represented by Formula (X-1) and a metal compound represented by Formula (1), and the cyan toner contains silicon phthalocyanine represented by Formula (2).

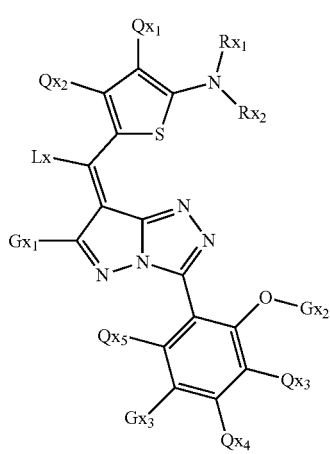

Formula (X-1)

[In the formula, $Rx_1$ and $Rx_2$ each independently represent an alkyl group, Lx represents a hydrogen atom or an alkyl group, $Gx_1$ represents an alkyl group having 2 or more carbon atoms, $Gx_2$ represents an alkyl group or an aromatic hydrocarbon group, and $Gx_3$ represents a hydrogen atom, a halogen atom, $Gx_4$-CO-NH-, or $Gx_5$-N($Gx_6$)-CO-, $Gx_4$ represents a substituent, and $Gx_5$ and $Gx_6$ each independently represent a hydrogen atom or a substituent, and $Qx_1$, $Qx_2$, $Qx_3$, $Qx_4$, and $Qx_5$ each independently represent a hydrogen atom or a substituent.]

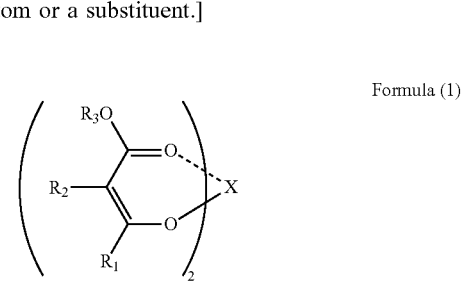

Formula (1)

[In the formula, $R_1$ and $R_2$ represent a hydrogen atom, an alkyl group, an alkenyl group, an alkynyl group, an aryl group, a heterocyclic group, an alkoxycarbonyl group, an aryloxycarbonyl group, a sulfamoyl group, a sulfinyl group, an alkylsulfonyl group, an arylsulfonyl group, a cyano group, a trifluoroalkyl group, or a nitro group, and any one of $R_1$ or $R_2$ represents an electron-withdrawing group, $R_3$ represents an alkyl group, an alkenyl group, an alkynyl group, an aryl group, or a heterocyclic group, having 3 or more carbon atoms, and X represents a metal atom such as copper, nickel, or cobalt.]

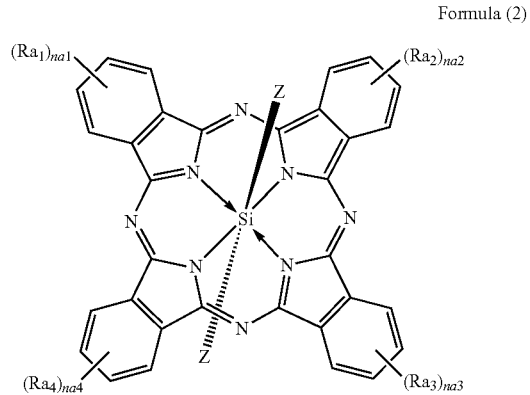

Formula (2)

[In the formula, Z's each independently represent a hydroxy group, a chlorine group, an aryloxy group having 6 to 18 carbon atoms, an alkoxy group having 1 to 22 carbon atoms, or a group represented by Formula (IV) shown below, $Ra_1$, $Ra_2$, $Ra_3$, and $Ra_4$ each independent represent a substituent, and na1, na2, na3, and na4 represent an integer of 0 to 4.]

Formula (IV)

[In the formula, $R^1$, $R^2$, and $R^3$ represent an alkyl group having 1 to 22 carbon atoms, an aryl group having 6 to 18 carbon atoms, an alkoxy group having 1 to 22 carbon atoms, or an aryloxy group having 6 to 18 carbon atoms, and $R^1$, $R^2$, and $R^3$ may be the same as or different from each other.]

Further, JP2006-276814A describes an electrophotographic toner which is obtained by dispersing, in a thermoplastic resin, colored fine particles containing a resin having a composition different from the thermoplastic resin and a dye, in which the dye is a metal chelate dye represented by Formula (1).

$$M(L1)(L2)n(X1)m(X2)l \cdot W1 \qquad \text{Formula (1)}$$

[In the formula, M represents a metal selected from Cu or Zn, X1 and X2 each independently represent a monodentate or bidentate ligand, X1 and X2 may be linked to each other, L1 and L2 each independently represent a ligand having infrared absorption from bidentate or tridentate visible, and may be the same as or different from each other, n, m and l represent 0 or 1, and W1 represents a counterion in a case where a counterion is required to neutralize an electric charge.]

SUMMARY

Aspects of non-limiting embodiments of the present disclosure relate to an electrostatic charge image developing toner, an electrostatic charge image developer, and a toner cartridge that have an excellent property of suppressing hot offset as compared with a case where a toner particle contains only one of a silicon phthalocyanine dye or a zirconium oxide particle.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The object is achieved by the following aspects.

According to an aspect of the present disclosure, there is provided an electrostatic charge image developing toner including a toner particle that contains a silicon phthalocyanine dye and a zirconium oxide particle.

BRIEF DESCRIPTION OF THE DRAWINGS

Exemplary embodiment(s) of the present invention will be described in detail based on the following figures, wherein.

DETAILED DESCRIPTION

Figure 1:
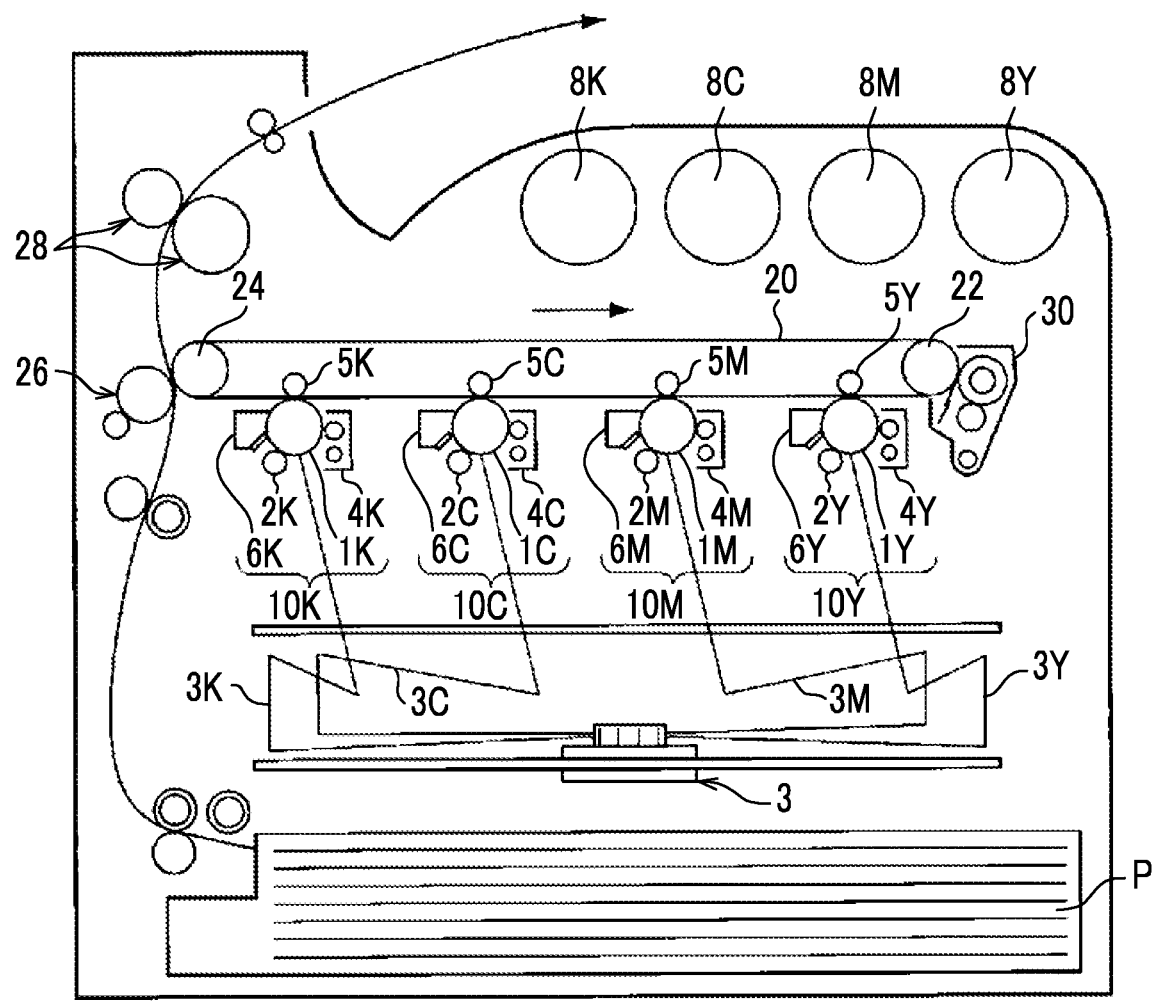
FIG. 1 is a schematic configuration view showing an example of an image forming device according to the present exemplary embodiment.

Hereinafter, exemplary embodiments that are examples of the present invention will be described.

In a numerical range described in a stepwise manner, an upper limit or a lower limit described in a certain numerical range may be replaced with an upper limit or a lower limit in another numerical range described in a stepwise manner.

Further, in a numerical range, an upper limit or a lower limit described in a certain numerical range may be replaced with a value shown in an example.

In a case where a plurality of kinds of substances corresponding to each component in a composition are present, the amount of each component in the composition indicates the total amount of the plurality of kinds of substances present in the composition unless otherwise specified.

In the present disclosure, the meaning of the term "step" includes not only an independent step but also a step whose intended purpose is achieved even in a case where the step is not clearly distinguished from other steps.

Electrostatic Charge Image Developing Toner

An electrostatic charge image developing toner according to the present exemplary embodiment contains a toner particle containing a silicon phthalocyanine dye and a zirconium oxide particle.

The color of the electrostatic charge image developing toner according to the present exemplary embodiment is not particularly limited, but the electrostatic charge image developing toner according to the present exemplary embodiment is preferably used as a cyan toner or a black toner.

The dye melts (molecularizes) during fixing and causes a decrease in melt viscosity, which causes deterioration of high-temperature fixability and causes deterioration of image quality during continuous printing. In particular, the present inventors have found that silicon phthalocyanine dyes are difficult to be compatible with each other and easily appear on the surface, and have low heat resistance, which causes hot offset due to image surface roughness and peeling.

In a case where the electrostatic charge image developing toner according to the present exemplary embodiment is used, since the toner contains the zirconium oxide particles, the surface of the toner particle is charged negatively due to the presence of the zirconium oxide particle in the toner particle, the silicon phthalocyanine dye functions as a nucleating agent that is collected around the zirconium oxide particle, the zirconium oxide particle having a surface to which the silicon phthalocyanine dye is attached or which is coordinated with the silicon phthalocyanine dye is formed into a particulate structure, and thus the filler effect works more than a case where the toner does not contain zirconium oxide particles, and accordingly, suppression of a decrease in melt viscoelasticity is assumed to lead to an excellent property of suppressing hot offset.

Toner Particles

The electrostatic charge image developing toner according to the present exemplary embodiment contains toner particles containing a silicon phthalocyanine dye and zirconium oxide particles. Further, it is preferable that the toner particles contain, for example, a binder resin. Further, the toner particles may contain a colorant, a release agent, and other additives.

Net Strength of Zr Element in Toner Particles

In the electrostatic charge image developing toner according to the present exemplary embodiment, from the viewpoints of the Net intensity of the Zr element measured by fluorescent X-ray analysis in the toner particles, the property of suppressing hot offset, and the transparency, the Net intensity is, for example, preferably 0.02 kcps or greater and 25.0 kcps or less and more preferably 0.03 kcps or greater and 10.0 kcps or less.

A method of measuring the Net intensity in the fluorescent X-ray analysis of the Zr element is as follows.

Approximately 0.5 g of toner particles are compressed by a load of 10 t and pressurization for 60 seconds using a compression molding machine to prepare a disc having a diameter of 10 mm and a thickness of 0.5 mm. The Net intensity of the Zr element (unit: kilo counts per second, kcps) is acquired by performing qualitative and quantitative elemental analysis under the following conditions using the disc as a sample and using a scanning fluorescent X-ray analyzer (ZSX PrimusII, manufactured by Rigaku Corporation).

Tube voltage: 40 kV
Tube current: 70 mA
Anticathode: rhodium
Measurement time: 15 minutes
Analytical diameter: diameter of 10 mm Further, in a case where the toner has an external additive, the toner (developer) to be measured is dispersed in water containing a surfactant, and ultrasonic treatment is performed, thereby obtaining toner particles from which the external additive has been removed.

Zirconium Oxide Particles

The toner particles contain, for example, zirconium oxide particles and preferably two or more kinds of zirconium oxide particles.

The zirconium oxide particles may be contained in the toner particles as an internal additive or an external additive, but from the viewpoints of the property of suppressing hot offset and the transparency, for example, it is preferable that the zirconium oxide particles are contained in the toner particles as an internal additive.

From the viewpoints of the property of suppressing hot offset and the transparency, the number average particle diameter of the zirconium oxide particles is, for example, preferably 5 nm or greater and 1.1 μm or less, more preferably 5 nm or greater and 500 nm or less, still more preferably 5 nm or greater and 100 nm or less, particularly preferably 5 nm or greater and 50 nm or less, and most preferably 5 nm or greater and 30 nm or less.

Further, from the viewpoints of the property of suppressing hot offset and transparency, the value of the ratio PT/PZ of the number average particle diameter PZ of the zirconium oxide particles and the volume average particle diameter PT of the toner particles is, for example, preferably 5 or greater, more preferably 10 or greater, still more preferably 20 or greater, and particularly preferably 50 or greater and 2,000 or less.

The toner particles may contain only one or two or more kinds of zirconium oxide particles.

From the viewpoints of the property of suppressing hot offset and the transparency, the content of the zirconium oxide particles is, for example, preferably 0.001% by mass or greater and 0.5% by mass or less, more preferably 0.002% by mass or greater and 0.2% by mass or less, and particularly preferably 0.003% by mass or greater and 0.1% by mass or less with respect to the total mass of the toner particles.

From the viewpoints of the property of suppressing hot offset and the transparency, the content ratio of the zirconium oxide particles to the silicon phthalocyanine dye (content of zirconium oxide particles/content of silicon phthalocyanine dye) is, for example, preferably 0.00015 or greater and 0.075, more preferably 0.0005 or greater and 0.050 or less, and particularly preferably 0.001 or greater and 0.003 or less.

Silicon Phthalocyanine Dye

The toner particles contain a silicon phthalocyanine dye.

In the toner particles, the silicon phthalocyanine dye may be dispersed in the binder resin in the particle form or may be molecularly dispersed in the binder resin, but from the viewpoints of the property of suppressing hot offset and the transparency, for example, it is preferable that at least a part of the silicon phthalocynanine dye is dispersed in the toner particles in the particle form.

In the silicon phthalocyanine dyes, from the viewpoints of the property of suppressing hot offset and the transparency, the number average particle diameter of the silicon phthalocyanine dyes dispersed in the toner particles in the particle form is, for example, preferably 10 nm or greater and 1,000 nm or less and more preferably 50 nm or greater and 300 nm or less.

In the present exemplary embodiment, the "pigment" is a colorant in which the solubility in 100 g of water at 23° C. and the solubility in 100 g of cyclohexanone at 23° C. are respectively less than 0.1 g, and the "dye" is a colorant in which the solubility in 100 g of water at 23° C. or the solubility in 100 g of cyclohexanone at 23° C. is 0.1 g or greater.

The number average particle diameter of the dye dispersed in the toner particles in the particle form is measured by dyeing a cross section formed by cutting the toner or the toner particle and analyzing the observation image with a transmission electron microscope (TEM). Specifically, for example, a dyeing agent is appropriately selected from ruthenium tetroxide, osmium tetroxide, phosphotungstic acid, uranyl acetate, and iodine such that the dyeing condition of the binder resin and the dye differs depending on the kinds of the binder resin and the dye, as described below.

7 g of a bisphenol A type liquid epoxy resin (manufactured by Asahi Kasei Corporation) and 3 g of ZENAMID250 (manufactured by Henkel Japan Ltd.) serving as a curing agent are gently mixed and prepared, further mixed with 1 g of a toner, and allowed to stand for 24 hours, thereby obtaining a cured product. A cutting sample obtained by embedding the cured product at −100° C. is cut using a cutting device LEICA Ultra Microtome (model number, ULTRACUUT UCT, manufactured by Hitachi High-Tech Corporation) equipped with a diamond knife (model number, Type Cryo, manufactured by Diatome Ltd.) to create an observation sample. The observation sample is allowed to stand in a desiccator under a ruthenium tetroxide (manufactured by Soekawa Rikagaku Co., Ltd.) atmosphere and dyed (the dyeing condition is determined based on the dyeing condition of the tape allowed to stand simultaneously). With the stained observation sample, a cross-sectional view of the dyed toner is observed at a magnification of 10000 to 100000 times with a Hitachi high-resolution field emission scanning electron microscope (S-4800, manufactured by Hitachi High-Tech Corporation) equipped with a transmission electron detector. The number average particle diameter is calculated by observing cut surfaces of 300 toner particles from the TEM image to be observed, specifying the dyed portions in the toner particles based on the difference in dyeing condition, and measuring the dispersed particle diameters of the portions dispersed in the particle form. The dye portions based on the dyeing condition are determined by respectively dyeing the dye alone, the mixture of the dye and the binder resin, and the binder resin alone with the dyeing agent and comparing the materials.

The number average particle diameter of the portion where the dye is dispersed in the particle form may be calculated by digitizing the observed image and performing image processing. For example, the TEM image is digitized and taken in the image analysis software (Win ROOF, manufactured by Mitani Corporation), the toner cross-sectional area in the embedding agent is selected as the selection target, binarization processing is performed using an "automatic binarization-discriminant analysis method" of the "binarization processing" command, and the portion where the dye is dispersed in the particle form is separated from the binder resin portion. Here, it is confirmed, by comparison with the image before the binarization, whether the portion of the binarized image where the dye is dispersed in the particle form is separated by one particle at a time. In a case where a plurality of particles are connected and binarized, the binarization threshold is adjusted that each particle such is independently binarized, or the region is manually divided and the portion where the dye is dispersed in the particle form is modified such that the portion where each particle of the dye is dispersed in the particle form is formed. The region of the extracted portion where the dye is dispersed in the particle form is selected, and the maximum ferret diameter is acquired and defined as the particle diameter of the portion where the dye is dispersed in the particle form.

In a case where binarization cannot be performed normally due to the photographing density or noise of the photograph, the image is sharpened by performing "filter-median" processing or edge extraction processing, and the boundary may be set manually.

The silicon phthalocyanine dye is not particularly limited, but from the viewpoints of the property of suppressing hot offset and the transparency, a silicon phthalocyanine dye having an aromatic ring is preferable, a silicon phthalocyanine dye having an aromatic ring and a thiophene ring is more preferable, and a compound represented by Formula (I) is particularly preferable. In the compound represented by Formula (I), a silicon atom (Si) is used as a metal atom (hereinafter, also referred to as a central metal atom) positioned at the center of the phthalocyanine ring.

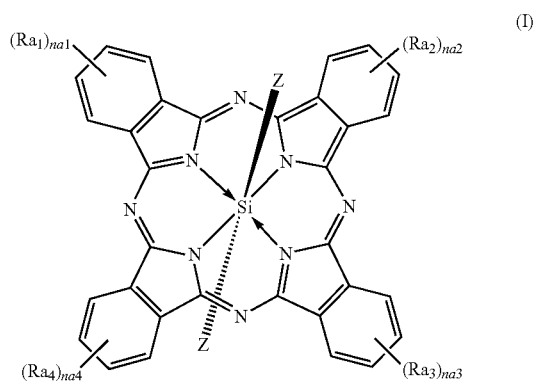

(I)

In Formula (I), Z's each independently represent a hydroxy group, a chlorine atom, an aryloxy group having 6 or more and 18 or less carbon atoms, an alkoxy group having 1 or more and 22 or less carbon atoms, or a group represented by Formula (II), $Ra_1$ to $Ra_4$ each independently represent a substituent, and na1 to na4 each independently represent an integer of 0 or greater and 4 or less.

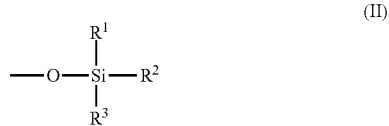

(II)

In Formula (II), $R^1$ to $R^3$ each independently represent an alkyl group having 1 or more and 22 or less carbon atoms, an aryl group having 6 or more and 18 or less carbon atoms, an alkoxy group having 1 or more and 22 or less carbon atoms, or an aryloxy group having 6 or more and 18 or less carbon atoms.

In Formula (I), $R^1$, $R^2$, and $R^3$ represent an alkyl group having 1 to 22 carbon atoms, an aryl group having 6 to 18 carbon atoms, an alkoxy group having 1 to 22 carbon atoms, or an aryloxy group having 6 to 18 carbon atoms. Further, $R^1$, $R^2$, and $R^3$ may be the same as or different from each other. Further, $R^1$, $R^2$, and $R^3$ represent an alkyl group, an aryl group, an alkoxy group, or an aryloxy group having the same number of carbon atoms as described above, but the number of carbon atoms of the alkyl group or the alkoxy group is, for example, preferably in a range of 1 to 10 and more preferably in a range of 2 to 8.

The compound represented by Formula (I) is a phthalocyanine compound having an axial ligand that is referred to as a tetraazaporphyrin-based compound represented by Formula (I) in which a silicon atom is used as the central metal atom. Here, the axial ligand is represented by Z in the above formula (I).

The toner containing a compound represented by Formula (I) can exhibit more satisfactory color reproducibility as compared with a toner containing a phthalocyanine compound having no axial ligand. It is assumed that this is because the compound represented by Formula (I) has a more complicated structure than the structure of a phthalocyanine compound having no axial ligand, and thus aggregation and crystallization of the compound are unlikely to occur. As a result, it is considered that the color reproducibility is improved by maintaining the high dispersibility of the compound represented by Formula (I) in the toner particles or the fixed image.

Further, it is assumed that since the compound represented by Formula (I) has a structure that is difficult to aggregate and crystallize, the compound is incorporated into the toner particles in a uniformly dispersed state in the toner production step, and as a result, the formed toner easily expresses satisfactory color reproducibility.

Further, as Z constituting the compound represented by Formula (I), for example, a group represented by Formula (II) is preferable among the above-described groups. $R^1$, $R^2$, and $R^3$ in the group represented by Formula (II) represent an alkyl group having 1 to 6 carbon atoms, an aryl group having 6 to 18 carbon atoms, and an alkoxy group having 1 to 6 carbon atoms, and $R^1$, $R^2$, and $R^3$ may be the same as or different from each other.

In particular, for example, an n-propyl group, an isopropyl group, an n-butyl group, an isobutyl group, and a t-butyl group are preferable. $R^1$, $R^2$, and $R^3$ may be the same as or different from each other.]

Specific examples of the compound represented by Formula (I) are listed in Table 1 below, but it goes without saying that the compounds represented by Formula (I) that can be used in the present exemplary embodiment are not limited to the examples listed in Table 1.

TABLE 1

| Compound No. | Z | Substituent of atomic group |
|---|---|---|
| I-1 | —O—Si $(CH_2CH_3)_3$ | |
| I-2 | —OH | |
| I-3 | —O—Si $(CH_2CH_2CH_3)_3$ | |
| I-4 | —O—Si $(CH_3)$ | |
| I-5 | —O—Si $(CH(CH_3)_2)_3$ | |
| I-6 | —Cl | |
| I-7 | —O—Si $(CH_2CH_2CH_2CH_2CH_2CH_2CH_2CH_3)(CH_3)_2$ | |
| I-8 | —O—Si $(t-C_4H_9)_3$ | |
| I-9 | —O—Si $(C_2H_5)_3$ | Chloro group (monochloro) |

TABLE 1-continued

| Compound No. | Z | Substituent of atomic group |
|---|---|---|
| I-10 | —O—Si (C$_2$H$_5$)$_3$ | Chloro group (dichloro) |
| I-11 | —O—Si (C$_2$H$_5$)$_3$ | Trifluoromethyl group |
| I-12 | —O—Si (C$_{11}$H$_{23}$) (CH$_3$)$_2$ | |
| I-13 | —O—Si (C$_{22}$H$_{45}$) (CH$_2$CH$_3$) (CH$_3$) | |
| I-14 | —O—Si (CH$_2$CH$_3$) (CH$_3$) (C$_6$H$_5$) | |
| I-15 | —O—Si (CH$_2$CH$_3$) (CH$_3$) (C$_{18}$H$_{11}$) | |
| I-16 | —O—Si (OCH$_3$) (OC$_{22}$H$_{45}$) CH$_3$ | |
| I-17 | —O—Si (OC$_2$H$_5$)$_2$ (OC$_{10}$H$_{21}$) | |
| I-18 | —O—CH$_3$ | |
| I-19 | —O—CH$_2$CH$_3$ | |
| I-20 | —O—CH$_2$ (CH$_2$)$_6$CH$_3$ | |
| I-21 | —O—C$_{11}$H$_{23}$ | |
| I-22 | —O—C$_{22}$H$_{25}$ | |
| I-23 | —O—C$_6$H$_5$ (phenoxy group) | |
| I-24 | —O—C$_{10}$H$_7$ (naphthoxy group) | |
| I-25 | —O—C$_{14}$H$_9$ (anthryloxy group) | |
| I-26 | —O—C$_{16}$H$_9$ (pyrenyloxy group) | |
| I-27 | —O—C$_{18}$H$_{11}$ | |

The structures of I-9, I-10 and I-11 are shown below.

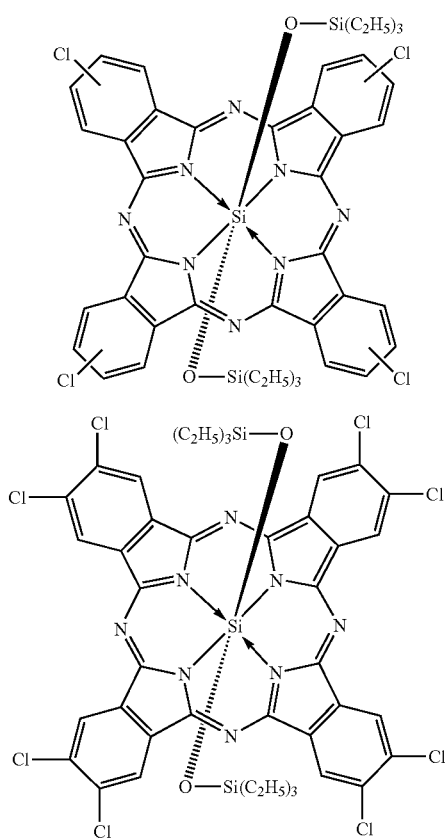

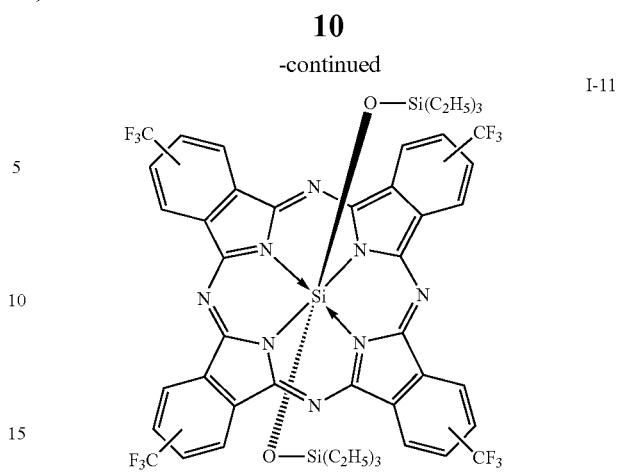

The silicon phthalocyanine dye contained in the toner particles may be used alone or in combination of two or more kinds thereof.

From the viewpoints of the property of suppressing hot offset and the transparency, the content of the silicon phthalocyanine dye is, for example, preferably 1% by mass or greater and 30% by mass or less and more preferably 2% by mass or greater and 20% by mass or less with respect to the total mass of the toner particles.

Binder Resin

From the viewpoints of the image intensity and suppressing density unevenness in an image to be obtained, it is preferable that the binder resin contains, for example, an amorphous resin and a crystalline resin.

From the viewpoints of the property of suppressing hot offset and the transparency, for example, it is preferable that the toner particles contain a resin having a refractive index of 1.48 or greater as the binder resin.

Further, from the viewpoints of the property of suppressing hot offset and the transparency, for example, it is preferable that the resin having a refractive index of 1.48 or greater is a styrene acrylic resin.

The refractive index of the binder resin is measured at 25° C. using a prism coupler, an ellipsometer, or an Abbe refractive index meter.

Here, the amorphous resin is a resin that shows only a stepwise endothermic change without having a clear endothermic peak in the thermal analysis measurement using differential scanning calorimetry (DSC), and is a solid at room temperature and thermoplasticized at a temperature higher than or equal to the glass transition temperature.

In addition, the crystalline resin indicates a resin having a clear endothermic peak without showing a stepwise change in endothermic amount in differential scanning calorimetry (DSC).

Specifically, for example, the crystalline resin means that the half-width of the endothermic peak which is measured at a temperature rising rate of 10° C./min is 10° C. or lower, and the amorphous resin means a resin having a half-width of higher than 10° C. or a resin in which a clear endothermic peak is not observed.

The amorphous resin will be described.

Examples of the amorphous resin include known amorphous resins such as an amorphous polyester resin, an amorphous vinyl resin (such as a styrene acrylic resin), an epoxy resin, a polycarbonate resin, and a polyurethane resin. Among the examples, from the viewpoint of suppressing image density unevenness and suppressing whitened spots in an image to be obtained, for example, an amorphous polyester resin or an amorphous vinyl resin (particularly a styrene acrylic resin) is preferable, and an amorphous polyester resin is more preferable.

Further, a combination of an amorphous polyester resin and a styrene acrylic resin is also a preferable aspect of the amorphous resin.

Examples of the amorphous polyester resin include a condensed polymer of a polyvalent carboxylic acid and a polyhydric alcohol. As the amorphous polyester resin, a commercially available product or a synthesized product may be used.

Examples of the polyvalent carboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid), an aromatic dicarboxylic acid (for example, terephthalic acid, isophthalic acid, phthalic acid, or naphthalenedicarboxylic acid), an anhydride thereof, and lower (for example, having 1 or more and 5 or less carbon atoms) alkyl ester thereof. Among the examples, for example, an aromatic dicarboxylic acid is preferable as the polyvalent carboxylic acid.

As the polyvalent carboxylic acid, a combination of a dicarboxylic acid with a trivalent or higher valent carboxylic acid having a crosslinked structure or a branched structure may be used. Examples of the trivalent or higher valent carboxylic acid include trimellitic acid, pyromellitic acid, an anhydride thereof, and lower (for example, having 1 or more and 5 or less carbon atoms) alkyl ester thereof.

The polyvalent carboxylic acid may be used alone or in combination of two or more kinds thereof.

Examples of the polyhydric alcohol include an aliphatic diol (such as ethylene glycol, diethylene glycol, triethylene glycol, propylene glycol, butanediol, hexanediol, or neopentyl glycol), an alicyclic diol (such as cyclohexanediol, cyclohexanedimethanol, or hydrogenated bisphenol A) and an aromatic diol (such as an ethylene oxide adduct of bisphenol A or a propylene oxide adduct of bisphenol A). Among the examples, as the polyhydric alcohol, for example, an aromatic diol or an alicyclic diol is preferable, and an aromatic diol is more preferable.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolpropane, and pentaerythritol.

The polyhydric alcohol may be used alone or in combination of two or more kinds thereof.

The amorphous polyester resin is obtained by a known production method. Specifically, for example, the amorphous polyester resin is obtained by a method of setting the polymerization temperature to 180° C. or higher and 230° C. or lower, reducing the pressure inside the reaction system as necessary, and carrying out the reaction while removing water and alcohol generated during condensation. In a case where the raw material monomer is not dissolved or compatible at the reaction temperature, a solvent having a high boiling point may be added as a dissolution assistant to dissolve the monomer. In this case, the polycondensation reaction is carried out while the dissolution assistant is distilled off. In a case where a monomer with poor compatibility is present in the copolymerization reaction, the monomer with poor compatibility may be condensed with an acid or an alcohol to be polycondensed with the monomer in advance, and then polycondensed with the main component.

Examples of the binder resin, particularly an amorphous resin, include a styrene acrylic resin.

The styrene-acrylic resin is a copolymer obtained by copolymerizing at least a styrene-based monomer (a monomer having a styrene skeleton) and a (meth)acrylic monomer (a monomer containing a (meth)acrylic group and, for example, preferably a monomer containing a (meth)acryloxy group). The styrene acrylic resin includes, for example, a copolymer of a monomer of styrenes and a monomer of (meth)acrylic acid esters.

Further, the acrylic resin portion in the styrene acrylic resin has a partial structure obtained by polymerizing any one or both of an acrylic monomer and a methacrylic monomer. Further, "(meth)acryl" is an expression including both "acryl" and "methacryl".

Specific examples of the styrene-based monomer include styrene, alkyl-substituted styrene (such as α-methylstyrene, 2-methylstyrene, 3-methylstyrene, 4-methylstyrene, 2-ethylstyrene, 3-ethylstyrene, or 4-ethylstyrene), halogen-substituted styrene (such as 2-chlorostyrene, 3-chlorostyrene, or 4-chlorostyrene), and vinylnaphthalene. The styrene-based monomer may be used alone or in combination of two or more kinds thereof.

Among the examples, from the viewpoints of ease of reaction, ease of control of reaction, and further availability, for example, styrene is preferable as the styrene-based monomer.

Specific examples of the (meth)acrylic monomer include (meth)acrylic acid and (meth)acrylic acid ester. Examples of the (meth)acrylic acid ester include (meth)acrylic acid alkyl ester (such as methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, cyclohexyl (meth)acrylate, or butylcyclohexyl (meth)acrylate), (meth) acrylic acid aryl ester (such as phenyl (meth)acrylate, biphenyl (meth)acrylate, diphenylethyl (meth)acrylate, t-butylphenyl (meth)acrylate, or terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. The (meth)acrylic monomer may be used alone or in combination of two or more kinds thereof.

Among the (meth)acrylic monomers, from the viewpoint of the fixability, for example, (meth)acrylic acid ester containing an alkyl group having 2 or more and 14 or less carbon atoms (for example, preferably 2 or more and 10 or less carbon atoms and more preferably 3 or more and 8 or less carbon atoms) is preferable from among the (meth) acrylic esters.

Among the examples, for example, n-butyl (meth)acrylate is preferable, and n-butyl acrylate is particularly preferable.

The copolymerization ratio (on a mass basis, styrene-based monomer/(meth)acrylic monomer) of the styrene-based monomer to the (meth)acrylic monomer is not particularly limited, but is preferably in a range of 85/15 to 70/30.

The styrene acrylic resin may have a crosslinked structure. As the styrene-acrylic resin having a crosslinked structure, for example, the resin obtained by copolymerizing at least a styrene-based monomer, a (meth)acrylic acid-based monomer, and a crosslinkable monomer are preferable.

Examples of the crosslinkable monomer include bifunctional or higher functional crosslinking agents.

Examples of the bifunctional crosslinking agent include divinylbenzene, divinylnaphthalene, a di(meth)acrylate compound (such as diethylene glycol di(meth)acrylate, methylenebis(meth)acrylamide, decanediol diacrylate, or glycidyl (meth)acrylate), polyester-type di(meth)acrylate, and 2-([1'-methylpropylideneamino]carboxyamino)ethyl methacrylate.

Examples of the polyfunctional crosslinking agent include a tri(meth)acrylate compound (such as pentaerythritol tri(meth)acrylate, trimethylolethanetri(meth)acrylate, or trimethylolpropane tri(meth)acrylate), a tetra(meth)acrylate compound (such as pentaerythritol tetra(meth)acrylate or oligoester (meth)acrylate), 2,2-bis(4-methacryloxy polyethoxyphenyl)propane, diallyl phthalate, triallyl cyanurate, triallyl isocyanurate, triallyl trimellitate, and diallyl chlorendate.

Among the examples, from the viewpoints of suppressing a decrease in image density, suppressing image density unevenness from occurring, and the fixability, as the crosslinkable monomer, for example, a bifunctional or higher functional (meth)acrylate compound is preferable, a bifunctional (meth)acrylate compound is more preferable, a bifunctional (meth)acrylate compound containing an alkylene group having 6 or more and 20 or less carbon atoms is still more preferable, and a bifunctional (meth)acrylate compound containing a linear alkylene group having 6 or more and 20 or less carbon atoms is particularly preferable.

The copolymerization ratio of the crosslinkable monomer to all the monomers (on a mass basis, crosslinkable monomer/all monomers) is not particularly limited, but is preferably in a range of 2/1000 to 20/1000.

A method of preparing the styrene-acrylic resin is not particularly limited, and various polymerization methods (for example, solution polymerization, precipitation polymerization, suspension polymerization, bulk polymerization, and emulsion polymerization) are applied. A known operation (for example, a batch type, semi-continuous type, or continuous type operation) is applied to the polymerization reaction.

The proportion of the styrene acrylic resin in all the binder resins is, for example, preferably 0% by mass or greater and 20% by mass or less, more preferably 1% by mass or greater and 15% by mass or less, and still more preferably 2% by mass or greater and 10% by mass or less.

The proportion of the amorphous resin in all the binder resins is, for example, preferably 60% by mass or greater and 98% by mass or less, more preferably 65% by mass or greater and 95% by mass or less, and still more preferably 70% by mass or greater and 90% by mass or less.

The characteristics of the amorphous resin will be described.

The glass transition temperature (Tg) of the amorphous resin is, for example, preferably 50° C. or higher and 80° C. or lower and more preferably 50° C. or higher and 65° C. or lower.

Further, the glass transition temperature is acquired from the DSC curve obtained by differential scanning calorimetry (DSC) and more specifically acquired by the "extrapolated glass transition start temperature" described in the method of acquiring the glass transition temperature in JIS K 7121-1987 "Method of measuring transition temperature of plastics".

The weight-average molecular weight (Mw) of the amorphous resin is, for example, preferably 5,000 or greater and 1,000,000 or less and more preferably 7,000 or greater and 500,000 or less.

The number average molecular weight (Mn) of the amorphous resin is, for example, preferably 2,000 or greater and 100,000 or less.

The molecular weight distribution Mw/Mn of the amorphous resin is, for example, preferably 1.5 or greater and 100 or less and more preferably 2 or greater and 60 or less.

Further, the weight-average molecular weight and the number average molecular weight are measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average molecular weight and the number average molecular weight are calculated using a molecular weight calibration curve created by a monodisperse polystyrene standard sample based on the measurement results.

The crystalline resin will be described.

Examples of the crystalline resin include known crystalline resins such as a crystalline polyester resin and a crystalline vinyl resin (for example, a polyalkylene resin or a long-chain alkyl (meth)acrylate resin). Among the examples, from the viewpoint of suppressing density unevenness and suppressing whitened spots in an image to be obtained, for example, a crystalline polyester resin is preferable.

Examples of the crystalline polyester resin include a polycondensate of a polyvalent carboxylic acid and a polyhydric alcohol. As the crystalline polyester resin, a commercially available product or a synthesized product may be used.

Since the crystalline polyester resin easily forms a crystal structure, for example, a polycondensate obtained by using a linear aliphatic polymerizable monomer is preferable to a polymerizable monomer having an aromatic ring.

Examples of the polyvalent carboxylic acid include an aliphatic dicarboxylic acid (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid), an aromatic dicarboxylic acid (for example, a dibasic acid such as phthalic acid, isophthalic acid, terephthalic acid, or naphthalene-2,6-dicarboxylic acid), an anhydride thereof, and lower (for example, having 1 or more and 5 or less carbon atoms) alkyl ester thereof.

As the polyvalent carboxylic acid, a combination of a dicarboxylic acid with a trivalent or higher valent carboxylic acid having a crosslinked structure or a branched structure may be used. Examples of the trivalent carboxylic acid include an aromatic carboxylic acid (for example, 1,2,3-benzenetricarboxylic acid, 1,2,4-benzenetricarboxylic acid, or 1,2,4-naphthalenetricarboxylic acid), an anhydride thereof, and lower (for example, having 1 or more and 5 or less carbon atoms) alkyl ester thereof.

As the polyvalent carboxylic acid, a combination of such dicarboxylic acids with a dicarboxylic acid containing a sulfonic acid group and a dicarboxylic acid having an ethylenic double bond may be used.

The polyvalent carboxylic acid may be used alone or in combination of two or more kinds thereof.

Examples of the polyhydric alcohol include an aliphatic diol (for example, a linear aliphatic diol having a main chain portion with 7 or more and 20 or less carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the examples, for example, 1,8-octanediol, 1,9-nonanediol, or 1,10-decanediol is preferable as the aliphatic diol.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolethane, trimethylolpropane, and pentaerythritol.

The polyhydric alcohol may be used alone or in combination of two or more kinds thereof.

As the polyhydric alcohol, the content of the aliphatic diol may be 80% by mole or more and, for example, preferably 90% by mole or more.

The melting temperature of the crystalline polyester resin is, for example, preferably 50° C. or higher and 100° C. or lower, more preferably 55° C. or higher and 90° C. or lower, and still more preferably 60° C. or higher and 85° C. or lower.

The melting temperature of the crystalline polyester resin is acquired from the DSC curve obtained by differential scanning calorimetry (DSC) according to the "melting peak temperature" described in the method of acquiring the melting temperature in JIS K 7121:1987 "method of measuring transition temperature of plastics".

The weight-average molecular weight (Mw) of the crystalline polyester resin is, for example, preferably 6,000 or greater and 35,000 or less.

The crystalline polyester resin can be obtained by, for example, a known production method similar to the amorphous polyester resin.

From the viewpoint that a crystal structure is easily formed and the compatibility with the amorphous polyester resin is satisfactory so that the fixability of the image is improved, for example, a polymer of $\alpha,\omega$-linear aliphatic dicarboxylic acid and $\alpha,\omega$-linear aliphatic diol is preferable as the crystalline polyester resin.

As the $\alpha,\omega$-linear aliphatic dicarboxylic acid, for example, $\alpha,\omega$-linear aliphatic dicarboxylic acid in which the number of carbon atoms of an alkylene group connecting two carboxy groups is 3 or more and 14 or less is preferable, the number of carbon atoms of the alkylene group is more preferably 4 or more and 12 or less, and the number of carbon atoms of the alkylene group is still more preferably 6 or more and 10 or less.

Examples of the $\alpha,\omega$-linear aliphatic dicarboxylic acid include succinic acid, glutaric acid, adipic acid, 1,6-hexanedicarboxylic acid (common name, suberic acid), 1,7-heptanedicarboxylic acid (common name, azelaic acid), 1,8-octanedicarboxylic acid (common name, sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among the examples, 1,6-hexanedicarboxylic acid, 1,7-heptanedicarboxylic acid, 1,8-octanedicarboxylic acid, 1,9-nonanedicarboxylic acid, or 1,10-decanedicarboxylic acid is preferable.

The $\alpha,\omega$-linear aliphatic dicarboxylic acid may be used alone or in combination of two or more kinds thereof.

As the $\alpha,\omega$-linear aliphatic diol, for example, $\alpha,\omega$-linear aliphatic diol in which the number of carbon atoms of an alkylene group connecting two hydroxy groups is 3 or more and 14 or less is preferable, the number of carbon atoms of the alkylene group is more preferably 4 or more and 12 or less, and the number of carbon atoms of the alkylene group is still more preferably 6 or more and 10 or less.

Examples of the $\alpha,\omega$-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among the examples, 1,6-hexanediol, 1,7-heptanediol, 1,8-octanediol, 1,9-nonanediol, or 1,10-decanediol is preferable.

The $\alpha,\omega$-linear aliphatic diol may be used alone or in combination of two or more kinds thereof.

From the viewpoint that a crystal structure is easily formed and the compatibility with the amorphous polyester resin is satisfactory so that the fixability of the image is improved, as the polymer of the $\alpha,\omega$-linear aliphatic dicarboxylic acid and the $\alpha,\omega$-linear aliphatic diol, for example, a polymer of at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol is preferable. Among the examples, for example, a polymer of 1,10-decanedicarboxylic acid and 1,6-hexanediol is more preferable.

The proportion of the crystalline resin in all the binder resins is, for example, preferably 1% by mass or greater and 20% by mass or less, more preferably 2% by mass or greater and 15% by mass or less, and still more preferably 3% by mass or greater and 10% by mass or less.

Other Binder Resins

Examples of the binder resin include homopolymers of monomers such as ethylenically unsaturated nitriles (such as acrylonitrile and methacrylnitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), and copolymers obtained by combining two or more of such monomers.

Other examples of the binder resin include non-vinyl-based resins such as an epoxy resin, a polyurethane resin, a polyamide resin, a cellulose resin, a polyether resin, and modified rosin, mixtures of such resins with the above-described vinyl-based resins, and graft polymers obtained by polymerizing vinyl-based monomers in the coexistence of such resins.

The binder resins may be used alone or in combination of two or more kinds thereof.

The content of the binder resin is, for example, preferably 40% by mass or greater and 95% by mass or less, more preferably 50% by mass or greater and 90% by mass or less, and still more preferably 60% by mass or greater and 85% by mass or less with respect to the entirety of the toner particles.

Release Agent

It is preferable that the toner particles contain, for example, a release agent.

Examples of the release agent include hydrocarbon-based wax; natural wax such as carnauba wax, rice wax, or candelilla wax; synthetic or mineral/petroleum wax such as montan wax; and ester-based wax such as fatty acid ester or montanic acid ester. The release agent is not limited thereto.

From the viewpoint of suppressing density unevenness and suppressing whitened spots in an image to be obtained and from the viewpoint of having satisfactory compatibility with the amorphous polyester resin and as a result, improving the fixability of the image, as the release agent, for example, an ester wax is preferable, and an ester wax containing a higher fatty acid having 10 or more and 30 or less carbon atoms and a monovalent or polyvalent alcohol component having 1 or more and 30 or less carbon atoms is more preferable.

The ester wax is a wax having an ester bond. The ester-based wax may be any of a monoester, a diester, a triester, or a tetraester, and a known natural or synthetic ester wax can be employed.

Examples of the ester wax include an ester compound of a higher fatty acid (such as a fatty acid having 10 or more carbon atoms) and a monohydric or polyhydric aliphatic alcohol (such as an aliphatic alcohol having 8 or more carbon atoms), which has a melting temperature of 60° C. or higher and 110° C. or lower (for example, preferably 65° C. or higher and 100° C. or lower and more preferably 70° C. or higher and 95° C. or lower).

Examples of the ester wax include an ester compound of a higher fatty acid (caprylic acid, capric acid, lauric acid, myristic acid, palmitic acid, stearic acid, arachidic acid, behenic acid, or oleic acid) and an alcohol (a monohydric alcohol such as methanol, ethanol, propanol, isopropanol, butanol, capryl alcohol, lauryl alcohol, myristyl alcohol, cetyl alcohol, stearyl alcohol, or oleyl alcohols; or a polyhydric alcohol such as glycerin, ethylene glycol, propylene glycol, sorbitol, or pentaerythritol), and specific examples thereof include carnauba wax, rice wax, candelilla wax, jojoba oil, wood wax, beeswax, insect wax, lanolin, and montanic acid ester wax.

The melting temperature of the release agent is, for example, preferably 50° C. or higher and 110° C. or lower and more preferably 60° C. or higher and 100° C. or lower.

The melting temperature of the release agent is acquired from the DSC curve obtained by differential scanning calorimetry (DSC) according to the "melting peak temperature" described in the method of acquiring the melting temperature in JIS K7121:1987 "Method of measuring transition temperature of plastics".

The content of the release agent is, for example, preferably 1% by mass or greater and 20% by mass or less and more preferably 5% by mass or greater and 15% by mass or less with respect to the entirety of the toner particles.

Other Colorants

The toner particles may contain a colorant other than the silicon phthalocyanine dye and the acetylacetone metal compound.

Examples of other colorants include various pigments such as Carbon Black, Chrome Yellow, Hansa Yellow, Benzidine Yellow, Suren Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, Dupont Oil Red, Pyrazolon Red, Lithol Red, Rhodamin B Lake, Lake Red C, Pigment Red, Rose Bengal, Aniline Blue, Ultramarine Blue, Calco Oil Blue, Methylene Blue Chloride, Phthalocyanine Blue, Blue, Pigment Phthalocyanine Green, and Malachite Green Oxalate, and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

The other colorants may be used alone or in combination of two or more kinds thereof.

As the colorant, a surface-treated colorant may be used as necessary, or a combination with a dispersant may be used. Further, for example, a plurality of kinds of colorants may be used in combination as the other colorants.

The content of the other colorants is not particularly limited, but it is preferable that the content of the other colorants is smaller than the content of the silicon phthalocyanine dye.

Other Additives

Examples of other additives include known additives such as a magnetic material, a charge control agent, and inorganic powder. The additives are contained in the toner particles as internal additives.

Characteristics of Toner Particles and the Like

The toner particles may be toner particles having a single layer structure or toner particles having a so-called core-shell structure formed of a core portion (core particle) and a coating layer (shell layer) covering the core portion.

Here, the toner particles having a core-shell structure may be formed of, for example, a core portion containing a binder resin and, as necessary, other additives such as a colorant and a release agent, and a coating layer containing a binder resin.

The volume average particle diameter (D50v) of the toner particles is, for example, preferably 2 μm or greater and 15 μm or less, more preferably 4 μm or greater and 8 μm or less, still more preferably 4 μm or greater and 7 μm or less, and particularly preferably 5 μm or greater and 6.5 μm or less.

Further, various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5% aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. Further, the number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter) [(perimeter of circle having same projected area as particle image)/(perimeter of projected particle image)].

Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

Further, in a case where the toner has an external additive, the toner (developer) to be measured is dispersed in water containing a surfactant, and an ultrasonic treatment is performed, thereby obtaining toner particles from which the external additive has been removed.

Characteristics of Toner

The maximum endothermic peak temperature of the toner according to the present exemplary embodiment at the time of the first temperature increase by the differential scanning calorimeter (DSC) is, for example, preferably 58° C. or higher and 75° C. or lower. By setting the maximum endothermic peak temperature of the toner to 58° C. or higher and 75° C. or lower, the low-temperature fixability of the toner is improved.

The maximum endothermic peak temperature of the toner at the time of the first temperature increase by the differential scanning calorimeter (DSC) is measured as follows.

The melting points of indium and zinc are used for temperature correction of the detection unit of the device and the fusion heat of indium is used for the correction of the heat quantity using a differential thermal scanning calorimeter DSC-7 (manufactured by PerkinElmer Co., Ltd.). An aluminum pan is used for the sample, an empty pan is set for the control, and the temperature is increased from room temperature to 150° C. at a temperature increasing rate of 10° C./min. Further, in the obtained endothermic curve, the temperature that provides the maximum endothermic peak is acquired.

Method of Producing Toner

Next, a method for producing the toner according to the present exemplary embodiment will be described.

The toner according to the present exemplary embodiment can be obtained by externally adding the external additive to the toner particles after the production of the toner particles.

The toner particles may be produced by any of a dry production method (for example, a kneading and pulverizing method) or a wet production method (for example, an aggregation and coalescence method, a suspension polymerization method, or a dissolution suspension method). The production method is not particularly limited, and a known production method is employed. Among the examples, the toner particles may be obtained by, for example, the aggregation and coalescence method.

Examples of the aggregation and coalescence method include the methods described in JP2010-97101A and JP2006-154641A.

Examples of the kneading and pulverizing method include the methods described in JP2000-267338A.

Examples of the dissolution suspension method include the methods described in JP2000-258950A.

Further, specifically, for example, in a case where the resin particles are produced by the aggregation and coalescence method, the toner particles are produced by performing a step of preparing a resin particle dispersion liquid in which resin particles serving as a binder resin are dispersed (resin particle dispersion liquid preparation step), a step of allowing the resin particles and dye particles or titanium oxide pigment particles (other particles as necessary) to be aggregated in a dispersion liquid which has been mixed with the resin particle dispersion liquid and the colorant dispersion liquid (other particle dispersion liquids as necessary) to form aggregated particles (aggregated particle formation step), and a step of heating the aggregated particle dispersion liquid in which the aggregated particles are dispersed and fusing and coalescing the aggregated particles to form resin particles (fusion and coalescence step).

The details of each step will be described below.

In the following description, a method of obtaining resin particles containing other colorants and a release agent will be described, but the other colorants and the release agent are used as necessary. It goes without saying that additives other than the other colorants and the release agent may also be used.

Resin Particle Dispersion Liquid Preparation Step

For example, a colorant particle dispersion liquid in which the other colorant particles are dispersed and a release agent particle dispersion liquid in which the release agent particles are dispersed are prepared together with the resin particle dispersion liquid in which the resin particles serving as the binder resin are dispersed.

The resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

Among the examples, for example, it is preferable to use a nonionic surfactant and more preferable to use a combination of a nonionic surfactant with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Depending on the kind of resin particles, the resin particles may be dispersed in a dispersion medium by a phase inversion emulsification method. The phase inversion emulsification method is a method of dissolving the resin to be dispersed in a hydrophobic organic solvent in which the resin is soluble, adding a base to an organic continuous phase (O phase) for neutralization, adding an aqueous medium (W phase thereto, performing phase inversion from W/O to O/W, and dispersing the resin in the aqueous medium in the particle form.

The volume average particle diameter of the resin particles to be dispersed in the resin particle dispersion liquid is, for example, preferably 0.01 μm or greater and 1 μm or less, more preferably 0.03 μm or greater and 0.8 μm or less, and still more preferably 0.05 μm or greater and 0.6 μm or less.

The volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). The volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

Similarly to the resin particle dispersion liquid, for example, the colorant particle dispersion liquid such as a dye or a titanium oxide pigment and the release agent particle dispersion liquid are also prepared. That is, the same applies to the colorant particles to be dispersed in the colorant particle dispersion liquid and the release agent particles to be dispersed in the release agent particle dispersion liquid in terms of the volume average particle diameter of particles in the resin particle dispersion liquid, the dispersion medium, the dispersion method, and the content of the particles.

Aggregated Particle Formation Step

Next, the resin particle dispersion liquid, the colorant particle dispersion liquid, and the release agent particle dispersion liquid are mixed.

Further, the resin particles, the colorant particles, and the release agent particles are heteroaggregated in the mixed dispersion liquid to form aggregated particles including the resin particles, the colorant particles, and the release agent particles, which have a diameter close to the diameter of the target resin particles.

Specifically, for example, the aggregated particles are formed by adding an aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to a temperature close to the glass transition temperature of the resin particles (specifically, for example, a temperature higher than or equal to the glass transition temperature of the resin particles −30° C. and lower than or equal to the glass transition temperature thereof −10° C.) and allowing the particles to be dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the aggregating agent include a surfactant having a polarity opposite to the polarity of the surfactant contained in the mixed dispersion liquid, an inorganic metal salt, and a divalent or higher valent metal complex. In a case where a metal complex is used as the aggregating agent, the amount of the surfactant to be used is reduced, and the charging characteristics are improved.

In addition to the aggregating agent, an additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent to be added is, for example, preferably 0.01 parts by mass or greater and 5.0 parts by mass or less and more preferably 0.1 parts by mass or greater and less than 3.0 parts by mass with respect to 100 parts by mass of the resin particles.

Fusion and Coalescence Step

Next, the aggregated particle dispersion liquid in which the aggregated particles are dispersed is heated to, for example, a temperature higher than or equal to the glass transition temperature of the resin particles (for example, a temperature higher than the glass transition temperature of the resin particles by 30° C. to 50° C.) and heated to a temperature higher than or equal to the melting temperature of the release agent, and the aggregated particles are fused and coalesced, thereby forming toner particles.

In the fusion and coalescence step, the resin and the release agent are in a fused state at a temperature higher than or equal to the glass transition temperature of the resin particles and higher than or equal to the melting temperature of the release agent. Thereafter, the toner particles are cooled to obtain resin particles.

As a method of adjusting the aspect ratio of the release agent in the toner particles, crystal growth is carried out by holding the release agent at a temperature around the freezing point for a certain period of time during cooling or two or more kinds of release agents having different melting temperatures are used to promote crystal growth during cooling, and thus the aspect ratio can be adjusted.

The toner particles are obtained by performing the above-described steps.

Further, the toner particles may be produced by performing a step of obtaining the aggregated particle dispersion liquid in which the aggregated particles are dispersed, further mixing the aggregated particle dispersion liquid with the resin particle dispersion liquid in which the resin particles are dispersed, and allowing the resin particles to be aggregated such that the resin particles are further attached to the surface of each aggregated particle to form second aggregated particles and a step of heating the second aggregated particle dispersion liquid in which the second aggregated particles are dispersed and fusing and coalescing the second aggregated particles to form toner particles having a core-shell structure.

After completion of the fusion and coalescence step, toner particles in a dry state are obtained by performing a known cleaning step, a known solid-liquid separation step, and a known drying step on the toner particles formed in the solution. From the viewpoint of the charging properties, for example, displacement cleaning may be sufficiently performed as the cleaning step using ion exchange water. From the viewpoint of the productivity, for example, suction filtration, pressure filtration, or the like may be performed as the solid-liquid separation step. From the viewpoint of the productivity, for example, freeze-drying, flush drying, fluidized drying, vibratory fluidized drying, or the like may be performed as the drying step.

The electrostatic charge image developing toner according to the present exemplary embodiment is produced, for example, by adding an external additive to the obtained toner particles in a dry state and mixing the external additive with the toner particles. The mixing may be performed, for example, using a V blender, a Henschel mixer, a Lödige mixer, or the like.

Further, coarse particles of the resin particles may be removed as necessary using a vibratory sieving machine, a pneumatic sieving machine, or the like.

Electrostatic Charge Image Developer

An electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer obtained by mixing the toner and a carrier.

The carrier is not particularly limited, and examples thereof include known carriers. Examples of the carrier include a coated carrier obtained by coating the surface of a core material consisting of magnetic powder with a coating resin, a magnetic powder dispersion type carrier obtained by dispersing magnetic powder in a matrix resin so as to be blended, and a resin impregnation type carrier obtained by impregnating porous magnetic powder with a resin.

Further, each of the magnetic powder dispersion type carrier and the resin impregnation type carrier may be a carrier obtained by coating the surface of the particle constituting the carrier, serving as a core material, with a coating resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond, a product obtained by modifying the straight silicone resin, a fluororesin, polyester, polycarbonate, a phenol resin, and an epoxy resin.

Further, the coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

Here, the surface of a core material is coated with a coating resin by a method of coating the surface with a solution for forming a coating layer, which is obtained by dissolving a coating resin and various additives as necessary in an appropriate solvent. The solvent is not particularly limited, and may be selected in consideration of the coating resin to be used, coating suitability, and the like.

Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

An image forming device and an image forming method according to the present exemplary embodiment will be described.

The image forming device according to the present exemplary embodiment includes an image holding member, a charging unit that charges a surface of the image holding member, an electrostatic charge image forming unit that forms an electrostatic charge image on the surface of the charged image holding member, a developing unit that accommodates an electrostatic charge image developer and develops the electrostatic charge image formed on the surface of the image holding member as a toner image by the electrostatic charge image developer, a transfer unit that transfers the toner image formed on the surface of the image holding member to a surface of a recording medium, and a fixing unit that fixes the toner image transferred to the surface of the recording medium. Further, the electrostatic charge image developer according to the present exemplary embodiment is applied as the electrostatic charge image developer.

With the image forming device according to the present exemplary embodiment, an image forming method (the image forming method according to the present exemplary embodiment) including a charging step of charging a surface of the image holding member, an electrostatic charge image formation step of forming an electrostatic charge image on the surface of the charged image holding member, a developing step of developing the electrostatic charge image formed on the surface of the image holding member as a toner image by the electrostatic charge image developer according to the present exemplary embodiment, a transfer step of transferring the toner image formed on the surface of the image holding member to a surface of a recording medium, and a fixing step of fixing the toner image transferred to the surface of the recording medium is performed.

As the image forming device according to the present exemplary embodiment, a known image forming device such as a direct transfer type device that directly transfers a toner image formed on a surface of an image holding member to a recording medium, an intermediate transfer type device that primarily transfers a toner image formed on a surface of an image holding member to a surface of an intermediate transfer member and secondarily transfers the toner image transferred to the surface of the intermediate transfer member to a surface of a recording medium, a device that includes a cleaning unit cleaning a surface of an image holding member after transfer of a toner image and before charge of the image holding member, or a device that includes an electricity removing unit removing electricity by irradiating a surface of an image holding member with electricity removing light after transfer of a toner image and before charge of the image holding member is applied.

Among the examples, an image forming device that includes a cleaning unit cleaning a surface of an image holding member is exemplified. Further, as the cleaning unit, for example, a cleaning blade is preferable.

In a case where the image forming device according to the present exemplary embodiment is the intermediate transfer type device, for example, a configuration in which the transfer unit includes an intermediate transfer member having a surface onto which a toner image is transferred, a primary transfer unit primarily transferring the toner image formed on the surface of the image holding member to the surface of the intermediate transfer member, and a secondary transfer unit secondarily transferring the toner image transferred to the surface of the intermediate transfer member to the surface of the recording medium is applied.

In the image forming device according to the present exemplary embodiment, for example, the portion including the developing unit may have a cartridge structure (process cartridge) that is detachable from the image forming device. For example, a process cartridge including a developing unit that accommodates the electrostatic charge image developer according to the present exemplary embodiment is preferably used as the process cartridge.

Hereinafter, an example of the image forming device according to the present exemplary embodiment will be described, but the present exemplary embodiment is not limited thereto. Further, main parts shown in the figures will be described, but description of other parts will not be provided.

FIG. 1 is a schematic configuration view showing an image forming device according to the present exemplary embodiment.

The image forming device shown in FIG. 1 includes first to fourth image forming units 10Y, 10M, 10C, and 10K (image forming units) having an electrophotographic system of outputting images of each color of yellow (Y), magenta (M), cyan (C), and black (K) based on color-separated image data. The image forming units (hereinafter, also simply referred to as "units") 10Y, 10M, 10C, and 10K are arranged in parallel at predetermined intervals in the horizontal direction. The units 10Y, 10M, 10C, and 10K may be process cartridges detachable from the image forming device.

Above the units 10Y, 10M, 10C, and 10K shown in the figure, an intermediate transfer belt 20, extends, as an intermediate transfer member, across each of the units. The intermediate transfer belt 20 is provided by winding around a drive roll 22 and a support roll 24 in contact with the inner surface of the intermediate transfer belt 20, which are disposed to be separated from each other in the lateral direction in the figure, and is designed to travel in a direction from the first unit 10Y to the fourth unit 10K. A force is applied to the support roll 24 in a direction away from the drive roll 22 by a spring or the like (not shown), and a tension is applied to the intermediate transfer belt 20 winding around the support roll 24 and the drive roll 22. An intermediate transfer member cleaning device 30 facing the drive roll 22 is provided on a side surface of the image holding member of the intermediate transfer belt 20.

Each of four colors of yellow toner, magenta toner, cyan toner, and black toner stored in toner cartridges 8Y, 8M, 8C, and 8K is supplied to each of developing devices (an example of developing units) 4Y, 4M, 4C, and 4K of the units 10Y, 10M, 10C, and 10K.

Since the first to fourth units 10Y, 10M, 10C, and 10K have the same configuration, the first unit 10Y that forms a yellow image disposed on the upstream side in the traveling direction of the intermediate transfer belt will be described as a representative example. Further, the same portions as in the first unit 10Y are denoted by the reference numerals with magenta (M), cyan (C), and black (K) in place of yellow (Y), and thus the description of the second to fourth units 10M, 10C, and 10K will not be repeated.

The first unit 10Y includes a photoreceptor 1Y that functions as an image holding member. A charging roll (an example of the charging unit) 2Y that charges the surface of the photoreceptor 1Y at a predetermined potential, an exposure device (an example of the electrostatic charge image forming unit) 3 that exposes the charged surface to a laser beam 3Y based on a color-separated image signal to form an electrostatic charge image, a developing device (an example of a developing unit) 4Y that supplies the charged toner to the electrostatic charge image to develop the electrostatic charge image, a primary transfer roll 5Y (an example of the primary transfer unit) that transfers the developed toner image onto the intermediate transfer belt 20, and a photoreceptor cleaning device (an example of the cleaning unit) 6Y that removes the toner remaining on the surface of the photoreceptor 1Y after the primary transfer are arranged in this order in the periphery of the photoreceptor 1Y.

The primary transfer roll 5Y is disposed inside the intermediate transfer belt 20 and provided at a position facing the photoreceptor 1Y. Each bias power supply (not shown) that applies a primary transfer bias is connected to each of the primary transfer rolls 5Y, 5M, 5C, and 5K of the units. Each bias power supply changes the value of the transfer bias applied to each primary transfer roll by the control of a control unit (not shown).

Hereinafter, an operation of forming a yellow image in the first unit 10Y will be described.

First, prior to the operation, the surface of the photoreceptor 1Y is charged at a potential of −600 V to −800 V by the charging roll 2Y.

The photoreceptor 1Y is formed by laminating a photosensitive layer on a conductive substrate (for example, a volume resistivity of $1 \times 10^{-6}$ Ωcm or less at 20° C.). This photosensitive layer usually has a high resistance (the resistance of a typical resin), but has a property that in a case where the photosensitive layer is irradiated with a laser beam 3Y, the specific resistance of the portion irradiated with the laser beam changes. Therefore, the laser beam 3Y is output to the surface of the charged photoreceptor 1Y through the exposure device 3 according to yellow image data sent from the control unit (not shown). The photosensitive layer on the surface of the photoreceptor 1Y is irradiated with laser beam 3Y, and thus an electrostatic charge image with a yellow image pattern is formed on the surface of the photoreceptor 1Y.

The electrostatic charge image is an image formed on the surface of the photoreceptor 1Y by performing charging, which is a so-called negative latent image formed in a case where the specific resistance of the portion in the photosensitive layer irradiated with the laser beam 3Y is decreased by the laser beam 3Y, the charged charge on the surface of the photoreceptor 1Y flows, and the charge in a portion that has not been irradiated with the laser beam 3Y remains.

The electrostatic charge image formed n the photoreceptor 1Y rotates to a predetermined development position according to the traveling of the photoreceptor 1Y. Further, the electrostatic charge image on the photoreceptor 1Y is visualized (developed image) at this development position as a toner image by the developing device 4Y.

For example, an electrostatic charge image developer containing at least a yellow toner and a carrier is accommodated in the developing device 4Y. The yellow toner is stirred to be frictionally charged inside the developing device 4Y, has an electric charge having the same polarity (negative polarity) as the charged electric charge on the photoreceptor 1Y, and is held on a developer roll (an example of the developer holding member). Further, as the surface of the photoreceptor 1Y passes s through the developing device 4Y, the yellow toner is electrostatically attached to the statically eliminated latent image portion on the surface of the photoreceptor 1Y, and the latent image is developed by the yellow toner. The photoreceptor 1Y on which the yellow toner image is formed is continuously traveled at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner and is controlled to, for example, +10 μA by the control unit (not shown) in the first unit 10Y.

Further, the toner remaining on the photoreceptor 1Y is removed by the photoreceptor cleaning device 6Y and recovered.

The primary transfer bias applied to the primary transfer rolls 5M, 5C, and 5K of the second to fourth units 10M, 10C, and 10K is also controlled according to the first unit.

In this manner, the intermediate transfer belt 20 to which the yellow toner image is transferred by the first unit 10Y is sequentially transported through the second to fourth units 10M, 10C, and 10K, and the toner images of each color are superimposed and multiple-transferred.

The intermediate transfer belt 20, to which the toner images of four colors are multiple-transferred through the first to fourth units, reaches a secondary transfer unit formed of the intermediate transfer belt 20, a support roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is supplied to a gap where the secondary transfer roll 26 is in contact with the intermediate transfer belt 20 via a supply mechanism, at a predetermined timing, and a secondary transfer bias is applied to the support roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

Thereafter, the recording paper P is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is preferably used.

The recording paper P in which the fixation of the color images is completed is transported toward a discharge unit, and a series of color image forming operations is completed.

Process Cartridge and Toner Cartridge

The process cartridge according to the present exemplary embodiment will be described.

The process cartridge according to the present exemplary embodiment includes a developing unit which accommodates the electrostatic charge image developer according to the present exemplary embodiment and develops the electrostatic charge image formed on the surface of the image holding member a toner as image using the electrostatic charge image developer, and is detachably attached to the image forming device.

The configuration of the process cartridge according to the present exemplary embodiment is not limited thereto, and a configuration including a developing unit and, as necessary, at least one selected from other units such as an image holding member, a charging unit, an electrostatic charge image forming unit, or a transfer unit may be employed.

Hereinafter, an example of the process cartridge according to the present exemplary embodiment will be described, but the present invention is not limited thereto. Further, main parts shown in the figures will be described, but description of other parts will not be provided.

Figure 2:
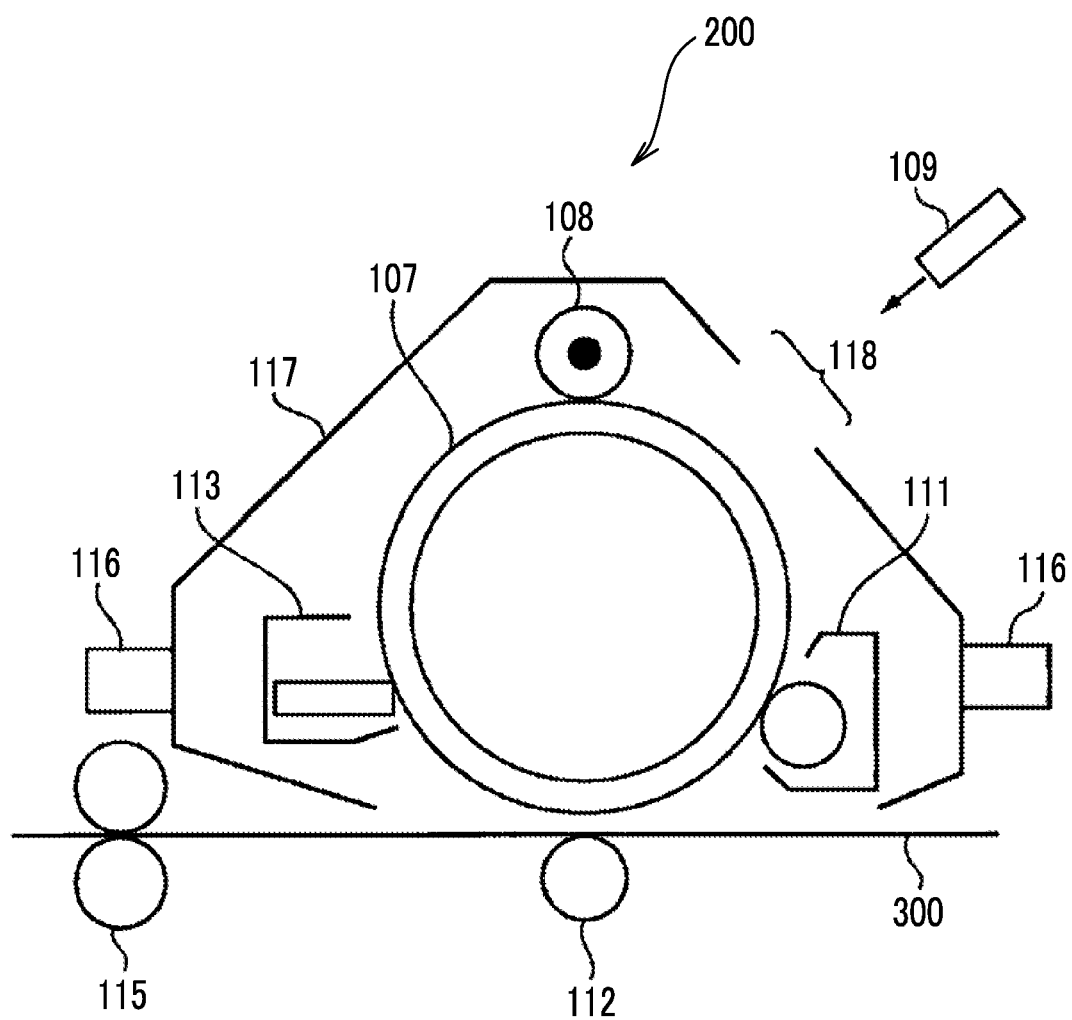
FIG. 2 is a schematic configuration view showing an example of a process cartridge according to the present exemplary embodiment.

FIG. 2 is a schematic configuration view showing the process cartridge according to the present exemplary embodiment.

A process cartridge 200 shown in FIG. 2 is, for example, configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

The toner cartridge according to the present exemplary embodiment will be described below.

The toner cartridge according to the present exemplary embodiment of the present disclosure is a toner cartridge that includes a container accommodating the toner according to the present exemplary embodiment t and is detachably attached to the image forming device. The toner cartridge includes a container that accommodates a toner for replenishment which is to be supplied to the developing unit provided in the image forming device.

The image forming device shown in FIG. 1 is an image forming device having a configuration in which the toner cartridges 8Y, 8M, 8C, and 8K are detachable, and the developing devices 4Y, 4M, 4C, and 4K are respectively connected to the toner cartridge corresponding to each developing device (color) through a toner supply tube (not shown). Further, in a case where the amount of toner accommodated in the container of the toner cartridge is decreased, the toner cartridge is replaced.

EXAMPLES

Hereinafter, the present exemplary embodiment will be described in more detail with reference to examples and comparative examples, but the present exemplary embodiment is not limited to such examples. In addition, "part" and "%" showing an amount are on a mass basis unless otherwise specified.

Further, I-1 to I-27 in the examples are respectively the same compounds as the above-described compounds I-1 to I-27.

Preparation of Zirconium Oxide Particle Dispersion Liquid 1

Zirconia nanoparticles (ZSL-10A (number average particle diameter of 80 nm), manufactured by Daiichi Kikenso Kagaku-Kogyo Co., Ltd.) are mixed with water, thereby preparing a zirconium oxide particle dispersion liquid 1 having a solid content of 0.01%.

Preparation of Zirconium Oxide Particle Dispersion Liquid 2

Zirconia nanoparticles (ZSL-10A (number average particle diameter of 80 nm), manufactured by Daiichi Kikenso Kagaku-Kogyo Co., Ltd.) are mixed with water, thereby preparing a zirconium oxide particle dispersion liquid 2 having a solid content of 1%.

Preparation of Zirconium Oxide Particle Dispersion Liquid 3

Zirconia nanoparticles (SZR-CW (number average particle diameter of 5 nm), manufactured by Sakai Chemical Industry Co., Ltd.) are mixed with water, thereby preparing a zirconium oxide particle dispersion liquid 3 having a solid content of 0.01%.

Preparation of Zirconium Oxide Particle Dispersion Liquid 4

Zirconia nanoparticles (TMZ zirconium oxide (number average particle diameter of 1.1 μm), manufactured by Daiichi Kikenso Kagaku-Kogyo Co., Ltd.) are mixed with water and surfactant (5% with respect to zirconia), thereby preparing a zirconium oxide particle dispersion liquid 4 having a solid content of 0.01%.

Preparation of Silica Particle Dispersion Liquid

Silica nanoparticles (QSG-100 (number average particle diameter of 110 nm), manufactured by Shin-Etsu Chemical Co., Ltd.) are mixed with water and surfactant (5% with respect to silica), thereby preparing a silica particle dispersion liquid having a solid content of 0.01%.

Preparation of Titanium Oxide Particle Dispersion Liquid

Titanium oxide nanoparticles (MT-600S (number average particle diameter of 50 nm), manufactured by Tayca Corporation) are mixed with water and surfactant (5% with respect to titanium oxide), thereby preparing a titanium oxide particle dispersion liquid having a solid content of 0.01%.

Preparation of Amorphous Resin Particle Dispersion Liquid
Preparation of Amorphous Polyester Resin Particle Dispersion Liquid (A1)

Terephthalic acid: 70 parts
Fumaric acid: 30 parts
Ethylene glycol: 41 parts
1,5-pentanediol: 48 parts A flask provided with a stirrer, a nitrogen introduction tube, a temperature sensor, and a rectifying tower is charged with the above-described materials and heated to 220° C. for 1 hour under a nitrogen gas stream, and 1 part of titanium tetraethoxide is put into 100 parts of the above-described materials. The temperature is increased to 240° C. for 0.5 hours while water to be generated is distilled off, the dehydration condensation reaction is continued at the temperature for 1 hour, and the reaction product is cooled. In this manner, an amorphous polyester resin having a weight-average molecular weight of 96,000 and a glass transition temperature of 61° C. is synthesized.

40 parts of ethyl acetate and 25 parts of 2-butanol are put into a container provided with a temperature control unit and a nitrogen substitution unit to prepare a mixed solvent, 100 parts of the amorphous polyester resin is gradually added to the solvent to be dissolved therein, and a 10% ammonia aqueous solution (amount equivalent to 3 times the molar ratio with respect to the acid value of the resin) is added thereto, and the solution is stirred for 30 minutes. Next, the inside of the container is substituted with dry nitrogen, the temperature is maintained at 40° C., 400 parts of ion exchange water is added dropwise thereto at a rate of 2 parts/minute while the mixed solution is stirred, and emulsification is performed. After completion of the dropwise addition, the temperature of the emulsified liquid is returned to 25° C., thereby obtaining a resin particle dispersion liquid in which resin particles having a volume average particle diameter of 190 nm are dispersed. The amount of the solid content is adjusted to 20% by adding ion exchange water to the resin particle dispersion liquid, thereby obtaining an amorphous polyester resin particle dispersion liquid (A1).

Preparation of Crystalline Polyester Resin Particle Dispersion Liquid
Preparation of Crystalline Polyester Resin Particle Dispersion Liquid (B2)

1,10-Decanedicarboxylic acid: 265 parts
1,6-Hexanediol: 168 parts
Dibutyl tin oxide (catalyst): 0.4 parts The above-described components are added to a heated and dried three-neck flask, the air in the container is made into an inert atmosphere with nitrogen gas by an operation under reduced pressure, and the mixture is stirred and refluxed at 180° C. for 5 hours by mechanical stirring. Thereafter, the mixture is gradually heated to 230° C. under reduced pressure, stirred for 2 hours, and air-cooled when the mixture enters a viscous state to stop the reaction. In the molecular weight measurement (in terms of polystyrene), the weight-average-molecular weight (Mw) of the obtained "crystalline polyester resin 2" is 13,000, and the melting temperature is 69° C. 90 parts of the obtained resin, 1.5 parts of an ionic surfactant NEOGEN RK (DKS Co., Ltd.), and 200 parts of ion exchange water are used, the mixture is heated to 120° C., sufficiently dispersed with ULTRA-TURRAX T50 (manufactured by IKA), and subjected to a dispersion treatment using a pressure discharge type Gaulin homogenizer for 1 hour, thereby obtaining a crystalline polyester resin particle dispersion liquid (B2) having a volume average particle diameter of 210 nm and a solid content of 23% by mass.

Preparation of Colorant Particle Dispersion Liquid

Silicon Phthalocyanine Dye I-3: 50 parts
Anionic surfactant (NEOGEN RK, manufactured by DKS Co., Ltd.): 5 parts
Ion exchange water: 193 parts The above-described components are mixed and treated with an ULTIMAIZER (manufactured by Sugino Machine Limited Co., Ltd.) at 240 MPa for 10 minutes to prepare a colorant particle dispersion liquid (concentration of solid contents: 20%).

Preparation of Release Agent Particle Dispersion Liquid
Preparation of Release Agent Particle Dispersion Liquid (W1)

Ester wax (WEP-5, manufactured by NOF Corporation, melting temperature of 85° C.): 100 parts
Anionic surfactant (NEOGEN RK, manufactured by DKS Co., Ltd.): 1 part Ion exchange water: 350 parts The above-described materials are mixed, heated to 100° C., dispersed using a homogenizer (ULTRA-TURRAX T50, manufactured by IKA), and subjected to a dispersion treatment using a Manton Gaulin high-pressure homogenizer (manufactured by Gaulin), thereby obtaining a release agent particle dispersion liquid (solid content of 20%) in which release agent particles having a volume average particle diameter of 220 nm are dispersed.

Example 1

Preparation of Toner Particles 1
  Zirconium oxide particle dispersion liquid 1: 7.8 parts by mass
  Amorphous polyester resin particle dispersion liquid 1: 150 parts by mass
  Colorant particle dispersion liquid: 25 parts by mass
  Release agent particle dispersion liquid: 35 parts by mass
  Crystalline polyester resin particle dispersion liquid: 50 parts by mass
  Polyaluminum chloride: 0.4 parts by mass
  Ion exchange water: 100 parts by mass The above-described components are sufficiently mixed and dispersed in a round stainless steel flask using ULTRA-TURRAX T50 (manufactured by IKA), and the inside of the flask is heated to 48° C. while being stirring in an oil bath for heating and maintained for 60 minutes, thereby preparing aggregated particles serving as a core portion. Thereafter, 100 parts by mass of the same amorphous polyester resin particle dispersion liquid as described above is slowly added thereto as a shell portion. Next, the pH in the system is adjusted to 8.0 using a sodium hydroxide aqueous solution having a concentration of 0.5 mol/L, the stainless steel flask is sealed, the stirring shaft is magnetically sealed, and the solution is heated to 90° C. while being continuously stirred and maintained for 30 minutes. After completion of the reaction, the solution is cooled at a temperature lowering rate of 5° C./min, filtered, sufficiently cleaned with ion exchange water, and subjected to solid-liquid separation by Nutsche-type suction filtration. The resultant is further redispersed using 3,000 parts by mass of ion exchange water at 30° C. and cleaned while being stirred at 300 rpm for 15 minutes. The cleaning operation is repeated 6 more times, solid-liquid separation is performed using No. 5A filter paper by Nutsche-type suction filtration when the pH of the filtrate reaches 7.54 and the electrical conductivity reaches 6.5 µS/cm. Next, vacuum-drying is continued for 24 hours, thereby obtaining a toner.

Preparation of Toner 1

1.5 parts by mass of hydrophobic silica (RY50, manufactured by Nippon Aerosil Co., Ltd., number average particle diameter of 140 nm) is mixed and blended with 100 parts by mass of the obtained toner particles 1 at 10,000 rpm for 30 seconds using a sample mill. Thereafter, the mixture is sieved with a vibrating sieve having a mesh opening of 45 µm, thereby preparing a toner 1. The volume average particle diameter of the obtained toner 1 is 5.7 µm.

Preparation of Carrier 500 parts of spherical magnetite powder particles (volume average particle diameter: 0.55 µm) are sufficiently stirred with a Henschel mixer, 5.0 parts of a titanate-based coupling agent is added thereto, and the mixture is heated 100° C. and mixed and stirred for 30 minutes, thereby obtaining spherical magnetite particles coated with a titanate-based coupling agent.

Subsequently, 6.25 parts of phenol, 9.25 parts of 35% formalin, 500 parts of the magnetite particles, 6.25 parts of 25% ammonia water, and 425 parts of water are added to a four-neck flask and mixed and stirred. Next, the mixture is allowed to react at 85° C. for 120 minutes while being stirred and cooled to 25° C., 500 parts of water is added thereto, the supernatant is removed, and the precipitate is washed with water. The resultant is dried at 150° C. or higher and 180° C. or lower under reduced pressure, thereby obtaining a carrier having an average particle diameter of 35 µm.

Preparation of Electrostatic Charge Image Developer 1

The obtained carrier and toner 1 are added to a V-blender at a ratio (toner:carrier) of 5:95 (mass ratio) and stirred for 20 minutes, thereby obtaining an electrostatic charge image developer 1.

Evaluation of Property of Suppressing Hot Offset

An unfixed image is output by adjusting the toner loading amount to 5.2 g/m$^2$ using a DocuCentreColor400 (manufactured by Fuji Xerox Co., Ltd.). OSC127 paper (manufactured by Fuji Xerox Co., Ltd.) is used as a recording medium. A solid image having an image density of 100% with a size of 50 mm×50 mm is used as an output image.

As device formed by removing a fixing device of ApeosPort IV C3370 (manufactured by Fuji Xerox Co., Ltd.) and modifying such that the fixing temperature can be changed is used as a fixing evaluation device. In the fixing evaluation device, the nip width is 6 mm, the nip thickness is 1.6 kgf/cm$^2$, and the process speed is 175 mm/sec.

The unfixed image is fixed at intervals of 5° C. from a fixing temperature of 160° C. to 220° C., the presence or absence of hot offset is visually confirmed, and the lowest temperature at which hot offset is generated is evaluated as a hot offset generation temperature. The evaluation standards are as follows —Evaluation Standards—
  A: The hot offset generation temperature is 210° C. or higher
  B: The hot offset generation temperature is 200° C. or higher and lower than 210° C.
  C: The hot offset generation temperature is 180° C. or higher and lower than 200° C.
  D: The hot offset generation temperature is lower than 180° C.

Evaluation of Image Transparency

Image Formation

A DocuCentre Color 400 remodeling machine (manufactured by Fuji Xerox Co., Ltd.) is charged with the obtained electrostatic charge image developer, the fixing temperature is set to 180° C., and a solid yellow image (40 mm×25 mm, toner mass of 4.0 g/m$^2$) and a halftone image (40 mm×25 mm, toner mass of 0.5 g/m$^2$) are formed in the OHP mode under an environment of a temperature of 23° C. and a relative humidity of 55%. As a recording medium, an OHP sheet for black and white (manufactured by Fuji Xerox Co., Ltd.) is used.

Evaluation Method

The ratio of scattered light to total transmitted light is measured using a fully automatic haze meter (TC-HIII DP type, manufactured by Tokyo Denki Co., Ltd.) in conformity with JIS K 7136: 2000 "Plastics-Determination of haze for transparent materials" and classified into the following four stages of G1 to G4. G2 to G4 are in acceptable ranges.
  G1: Less than 15%
  G2: 15% or greater and less than 20%
  G3: 20% or greater and less than 30%
  G4: 30% or greater Examples 2 to 9 and Comparative Examples 1 to 3

As listed in Table 2, each toner and each electrostatic charge image developer are prepared in the same manner as in Example 1 except that the kind and the amount of the silicon phthalocyanine dye during preparation of the colorant particle dispersion liquid are changed, the kind and the amount of the zirconium oxide particle dispersion liquid used to prepare the toner particles are changed, and the amorphous polyester resin particle dispersion liquid and the crystalline polyester resin particle dispersion liquid (PES) are changed to the following styrene acrylic resin particle dispersion (StAC), and the evaluation is performed. The results are listed in Table 2.

Preparation of Styrene-Acrylic Resin Particle Dispersion Liquid

Materials for Oil Phase
　Styrene (manufactured by Fujifilm Wako Pure Chemical Corporation): 30 parts inside of the reaction container is sufficiently substituted with nitrogen, and the inside of the reaction system is heated to 75° C. in an oil bath while the mixture is being stirred. The monomer emulsified dispersion liquid is gradually added dropwise to the reaction container over 3 hours to perform emulsion polymerization. After completion of the dropwise addition, the polymerization is further continued at 75° C. and stopped after 3 hours, thereby obtaining a styrene-acrylic resin particle dispersion liquid having a solid content of 42% by mass.

The volume average particle diameter is measured with a particle size distribution measuring device (LA-700 manufactured by HORIBA, Ltd.), and the diameter is 250 nm. The glass transition temperature of the resin is measured at a temperature increasing rate of 10° C./min with a differential scanning calorimeter (DSC-50, manufactured by Shimadzu Corporation), and the temperature is 52° C. The number average molecular weight (in terms of polystyrene) is measured according to GPC, and the value is 13,000.

TABLE 2

| | Binder resin Type | Zirconium oxide particle | | Silicon phthalocyanine dye | | Number average particle diameter of silicon phthalocyanine dye in toner particles (nm) | Net intensity of Zr element in toner particles, measured by fluorescent X-ray analysis | Property of suppressing hot offset | Transparency |
|---|---|---|---|---|---|---|---|---|---|
| | | Type of dispersion liquid used | Content in toner particles (% by mass) | Type | Used amount (parts by mass) | Content in toner particles (% by mass) | | | | |
| Example 1 | PES | 1 | 0.0011 | I-3 | 5 | 6.8 | 155 | 0.020 | C | G1 |
| Example 2 | PES | 2 | 0.5008 | I-3 | 5 | 6.8 | 155 | 24.30 | A | G3 |
| Example 3 | PES | 1 | 0.0013 | I-3 | 5 | 6.8 | 155 | 0.029 | B | G1 |
| Example 4 | PES | 2 | 0.2064 | I-3 | 5 | 6.8 | 155 | 9.933 | A | G2 |
| Example 5 | PES | 1 | 0.0013 | I-3 | 5 | 6.8 | 53 | 0.030 | C | G1 |
| Example 6 | PES | 1 | 0.0013 | I-3 | 5 | 6.8 | 297 | 0.031 | A | G1 |
| Example 7 | PES | 3 | 0.0011 | I-3 | 5 | 6.8 | 155 | 0.021 | B | G1 |
| Example 8 | PES | 4 | 0.0011 | I-3 | 5 | 6.8 | 155 | 0.022 | C | G3 |
| Example 9 | St/Ac | 2 | 0.2064 | I-3 | 5 | 6.8 | 155 | 9.940 | A | G1 |
| Comparative example 1 | PES | — | 0 | I-3 | 5 | 6.8 | 155 | −0.031 | D | G1 |
| Comparative example 2 | PES | Silica | 0.0011 | I-3 | 5 | 6.8 | 155 | 0.022 | D | G1 |
| Comparative example 3 | PES | Titanium oxide | 0.0011 | I-3 | 5 | 6.8 | 155 | 0.020 | D | G4 | n-Butyl acrylate (manufactured by Fujifilm Wako Pure Chemical Corporation): 10 parts
　β-carboxyethyl acrylate (manufactured by Rhodia Nicca, Ltd.): 1.3 parts
　Dodecanethiol (manufactured by Fujifilm Wako Pure Chemical Corporation): 0.4 parts
Materials for Aqueous Phase 1
　Ion exchange water: 17 parts
　Anionic surfactant: DOWFAX (manufactured by Dow Chemical Company): 0.4 parts
Materials for Aqueous Phase 2
　Ion exchange water: 40 parts.
　Anionic surfactant: DOWFAX (manufactured by Dow Chemical Company): 0.05 parts
　Ammonium peroxodisulfate (manufactured by Fujifilm Wako Pure Chemical Corporation): 0.4 parts The materials for the oil phase and the materials for the aqueous phase 1 are respectively mixed and stirred, and all the materials are mixed and stirred to obtain an emulsified dispersion liquid of the monomer. Separately, the materials for the aqueous phase 2 are put into a reaction container, the In Table 2, the refractive index (25° C.) of the amorphous polyester resin in PES is 1.50, the refractive index (25° C.) of the crystalline polyester resin is 1.53, and the refractive index (25° C.) of the styrene-acrylic resin of StAC is 1.57.

Further, the numerical value in the column of the amount of zirconium oxide particles of Comparative Example indicates the amount of silica particles, and the 2 numerical value in the column of the amount of zirconium oxide particles of Comparative Example 3 indicates the amount of titanium oxide particles.

Further, the toners obtained in the examples and the comparative examples are all cyan toners.

As shown in the results, it is found that the property of suppressing hot offset is excellent in the examples as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:
   a toner particle that contains a silicon phthalocyanine dye and a zirconium oxide particle,
   wherein a content of the silicon phthalocyanine dye is 2% by mass or greater and 20% by mass or less with respect to a total mass of the toner particles, and
   a content ratio of the zirconium oxide particle to the silicon phthalocyanine dye is 0.00015 or greater and 0.075 or less.

2. The electrostatic charge image developing toner according to claim 1,
   wherein a Net intensity of a Zr element in the toner particle, which is measured by fluorescent X-ray analysis, is 0.02 kcps or greater and 25.0 kcps or less.

3. The electrostatic charge image developing toner according to claim 2,
   wherein the Net intensity of the Zr element in the toner particle, which is measured by fluorescent X-ray analysis, is 0.03 kcps or greater and 10.0 kcps or less.

4. The electrostatic charge image developing toner according to claim 1,
   wherein the toner particle contains the zirconium oxide particle as an internal additive.

5. The electrostatic charge image developing toner according to claim 1,
   wherein the silicon phthalocyanine dye is a compound represented by Formula (I),

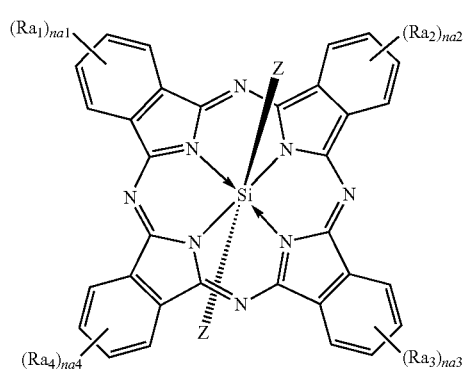

in Formula (I), Z's each independently represent a hydroxy group, a chlorine atom, an aryloxy group having 6 or more and 18 or less carbon atoms, an alkoxy group having 1 or more and 22 or less carbon atoms, or a group represented by Formula (II), $Ra_1$ to $Ra_4$ each independently represent a substituent, and na1 to na4 each independently represent an integer of 0 or greater and 4 or less,

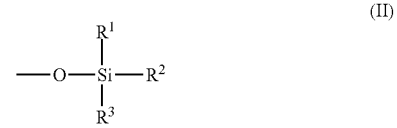

in Formula (II), $R^1$ to $R^3$ each independently represent an alkyl group having 1 or more and 22 or less carbon atoms, an aryl group having 6 or more and 18 or less carbon atoms, an alkoxy group having 1 or more and 22 or less carbon atoms, or an aryloxy group having 6 or more and 18 or less carbon atoms.

6. The electrostatic charge image developing toner according to claim 1,
   wherein at least a part of the silicon phthalocyanine dye is dispersed in the toner particle in a particle form.

7. The electrostatic charge image developing toner according to claim 6,
   wherein in the silicon phthalocyanine dye, a number average particle diameter of the silicon phthalocyanine dye dispersed in the toner particle in the particle form is 10 nm or greater and 1000 nm or less.

8. The electrostatic charge image developing toner according to claim 1,
   wherein a number average particle diameter of the zirconium oxide particle is 5 nm or greater and 1.1 μm or less.

9. The electrostatic charge image developing toner according to claim 1,
   wherein a content of the zirconium oxide particle is 0.001% by mass or greater and 0.5% by mass or less with respect to a total mass of the toner particle.

10. The electrostatic charge image developing toner according to claim 1,
    wherein the toner particle further contains a resin having a refractive index of 1.48 or greater as a binder resin.

11. The electrostatic charge image developing toner according to claim 10,
    wherein the resin having a refractive index of 1.48 or greater is a styrene acrylic resin.

12. An electrostatic charge image developer comprising:
    the electrostatic charge image developing toner according to claim 1.

13. A toner cartridge comprising:
    a container that accommodates the electrostatic charge image developing toner according to claim 1,
    wherein the toner cartridge is detachable from an image forming device.

* * * * *